United States Patent
Terry et al.

(10) Patent No.: US 12,509,241 B2
(45) Date of Patent: Dec. 30, 2025

(54) ISOLATOR ASSEMBLY WITH ADJUSTABLE PRELOAD FOR DAMPING AIR LOAD FORCES

(71) Applicant: Textron Aviation Inc., Wichita, KS (US)

(72) Inventors: James David Terry, Wichita, KS (US); Richard Charles Jensen, Goddard, KS (US); Jason Matthew Wilson, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 662 days.

(21) Appl. No.: 18/047,593

(22) Filed: Oct. 18, 2022

(65) Prior Publication Data

US 2023/0118117 A1 Apr. 20, 2023

Related U.S. Application Data

(60) Provisional application No. 63/326,491, filed on Apr. 1, 2022, provisional application No. 63/257,344, filed on Oct. 19, 2021.

(51) Int. Cl.
*B64D 43/00* (2006.01)
*F16F 15/04* (2006.01)

(52) U.S. Cl.
CPC .............. *B64D 43/00* (2013.01); *F16F 15/04* (2013.01); *F16F 2230/0005* (2013.01); *F16F 2234/04* (2013.01)

(58) Field of Classification Search
None
See application file for complete search history.

(56) References Cited

U.S. PATENT DOCUMENTS

| 7,806,368 B1 | 10/2010 | Smith et al. |
| 8,702,036 B2 | 4/2014 | Curry et al. |
| 9,126,697 B2 | 9/2015 | Ullman et al. |
| 9,348,197 B2 | 5/2016 | Lewis |

(Continued)

FOREIGN PATENT DOCUMENTS

| CN | 102689863 A | * | 9/2012 | ........... B60G 17/017 |
| DE | 19818002 A1 | * | 10/1999 | ............ B60T 17/046 |

OTHER PUBLICATIONS

CN-102689863-A: English Machine Translation (Year: 2012).*
DE-19818002-A1: English Machine Translation (Year: 1999).*

Primary Examiner — Melanie Torres Williams
(74) Attorney, Agent, or Firm — Avek IP, LLC (57) ABSTRACT

An isolator assembly is configured for damping vibrations of a sensor deployed outside of an aircraft. The isolator assembly includes a platform configured for mechanically supporting the sensor, a lift mechanism configured to raise and lower the platform for stowing the sensor inside the aircraft and deploying the sensor outside the aircraft, and a plate secured inside the aircraft beneath the platform. The plate includes a through-hole for the sensor to extend through. A pin extends below the platform and an isolator mount is disposed on a top side of the plate. The isolator mount includes a slot configured to receive the pin upon deploying the sensor outside the aircraft. The platform and the plate are configured to stabilize the sensor and the isolator assembly is configured to damp vibrations imparted on the sensor by the airstream during flight.

19 Claims, 9 Drawing Sheets

(56) References Cited

U.S. PATENT DOCUMENTS

| | | |
|---|---|---|
| 10,816,056 B2 | 10/2020 | Chang et al. |
| 2004/0113339 A1* | 6/2004 | Masterson .............. F16F 15/08 267/153 |
| 2005/0029398 A1 | 2/2005 | Lowe et al. |
| 2005/0029399 A1 | 2/2005 | Lowe et al. |
| 2011/0315822 A1 | 12/2011 | Fairchild |
| 2022/0016758 A1 | 1/2022 | Whitiker |
| 2023/0122760 A1 | 4/2023 | Collado |

* cited by examiner

ISOLATOR ASSEMBLY WITH ADJUSTABLE PRELOAD FOR DAMPING AIR LOAD FORCES

CROSS-REFERENCE TO RELATED APPLICATIONS

This application claims the benefit of priority of U.S. Provisional Patent Application No. 63/326,491 entitled "Isolator Assembly With Adjustable Preload For Damping Air Load Forces" and filed on Apr. 1, 2022, and U.S. Provisional Patent Application No. 63/257,344, entitled "Sensor Lift Mechanism for Aircraft" and filed on Oct. 19, 2021, the disclosures of which are both herein incorporated by reference in their entirety.

BACKGROUND OF THE INVENTION

1. Field

The disclosed embodiments relate generally to aircraft mechanical systems. More specifically, the embodiments relate to damping air-load oscillations for mechanically-lowered sensors in aircraft.

2. Description of the Related Art

Different types of vibration isolation systems have been described in the prior art. For example, U.S. Pat. No. 10,816,056 to Chang et al. describes a vibration isolation system for use in aircraft having flexures and a multi-part mounting interface for coupling an equipment mount to a structure mount. U.S. Pat. No. 9,348,197 to Lewis describes a platform stabilization system for vibration isolation of a payload having a support frame, a platform for carrying a payload, and isolators extending between the support frame and the platform. U.S. Pat. No. 9,126,697 to Ullman et al. describes a vibration isolation system for a turret mounted on a lower side of an aircraft fuselage having a rigid outer layer on an external surface of the turret and a viscoelastic inner layer disposed between the turret and the rigid outer layer.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, an isolator assembly includes: a platform configured for being raised upwards and lowered downwards; a pin having first end and a second end opposite the first end, wherein the pin is mechanically coupled to the platform via the first end, and the second end extends downwardly below the platform; and an isolator mount fastened to a plate, wherein the isolator mount includes: a vibration-damping material; a slot configured to receive the pin; and upon lowering the platform downwards, the pin is inserted into the isolator mount such that vibrational motion from the platform is damped via the isolator mount.

In an embodiment, an isolator assembly for damping vibrations of a sensor deployed outside of an aircraft includes: a platform configured for mechanically supporting the sensor; a lift mechanism configured to raise and lower the platform for stowing the sensor inside the aircraft and deploying the sensor outside the aircraft; a plate secured inside the aircraft beneath the platform, wherein the plate includes a through-hole for the sensor to extend therethrough; a pin extending below the platform; and an isolator mount disposed on a top side of the plate, wherein the isolator mount includes a slot configured to receive the pin upon deploying the sensor outside the aircraft, wherein the isolator mount, the platform, and the plate are configured to stabilize the sensor.

BRIEF DESCRIPTION OF THE SEVERAL VIEWS OF THE DRAWINGS

Illustrative embodiments are described in detail below with reference to the attached drawing figures, which are incorporated by reference herein and wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Aircraft are often used to collect data via sensors and/or instruments deployed outside of the aircraft and into the airstream. The sensors may be lowered by a mechanical device and suspended in the airstream while collecting data. The sensors may be housed in a nose section of the aircraft. In some embodiments, the sensors are deployed near the tail cone of the aircraft or at some other location.

Vortex shedding is an oscillating flow phenomenon that may occur when air flows at a sufficient velocity across non-streamlined features (e.g., a deployed sensor). Vortex shedding imparts air loads onto the sensor that may result in oscillating deflections which may, in turn, negatively affect the performance of sensitive electronic and electromechanical components in the sensors. As the stiffness of the mechanical device supporting the sensor decreases, the amplitude of the defection caused by the oscillating air loads increases.

Sensors are typically lowered into the airstream using a cantilevered lift system which is inherently subject to higher deflections due to the sensor being attached at an end of the lift system, which creates a long moment arm. Further, aircraft typically lack the space necessary to install systems capable of handling the substantially large Z-axis (up/down) loads resulting from the oscillating deflections.

Typically, limiting oscillations on deployed sensors is done by pressing the mechanical lift system into mounted rubber pads. Such a method relies on precise rigging to maintain a constant Z-axis load. The Z-axis load then develops frictional forces along the X-axis (forward/aft) and Y-axis (port/starboard) that dampen oscillations. The reliance on a constant Z-axis force leads to a heavy dependence on the rigging of the lift system that can prove unreliable. As such, there is a need for improved systems that can provide a consistent damping response to the air loads.

Embodiments disclosed herein are generally directed to an isolator assembly for damping air loads imparted onto a sensor deployed into the airstream. A sensor lift mechanism may extend (e.g., lower) and retract (e.g., raise) a sensor, instrument, or other payload into and out of an aircraft. An isolator assembly for the sensor lift mechanism may comprise a structural pin which is driven into a vibration-isolating mount when the sensor is deployed. The mount may comprise a seat configured to receive the structural pin. The seat may be adjustable to set an amount of preload in the structural pin. With the structural pin inserted into the seat, X- and Y-axis forces in both positive and negative directions may be transferred to the vibration-isolating mount as a compressive load. Additionally, Z-axis forces in the downwards direction may be transferred to the mount as compressive loads. By transferring these forces into the vibration-isolating mount, a constant damping response to oscillating air loads is provided that is less sensitive to improper rigging. The isolator assembly may be easily adjustable for various use cases by adjusting the amount of preload in the structural pin and/or by changing the material of the vibration-isolating mount to vary the vibration damping characteristics.

Figure 1A:
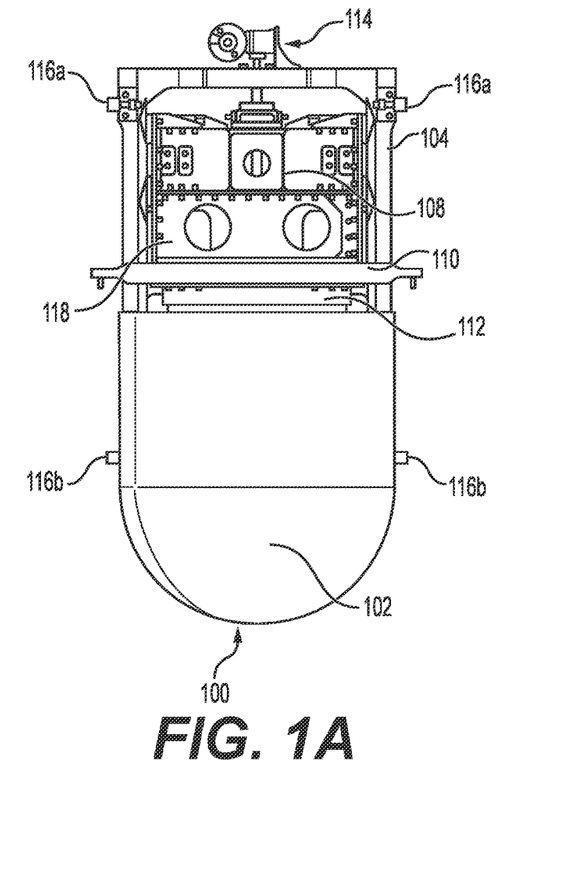
FIG. 1A illustrates a sensor lift mechanism for deploying a sensor outside of an aircraft in a raised position for some embodiments.
Figure 1B:
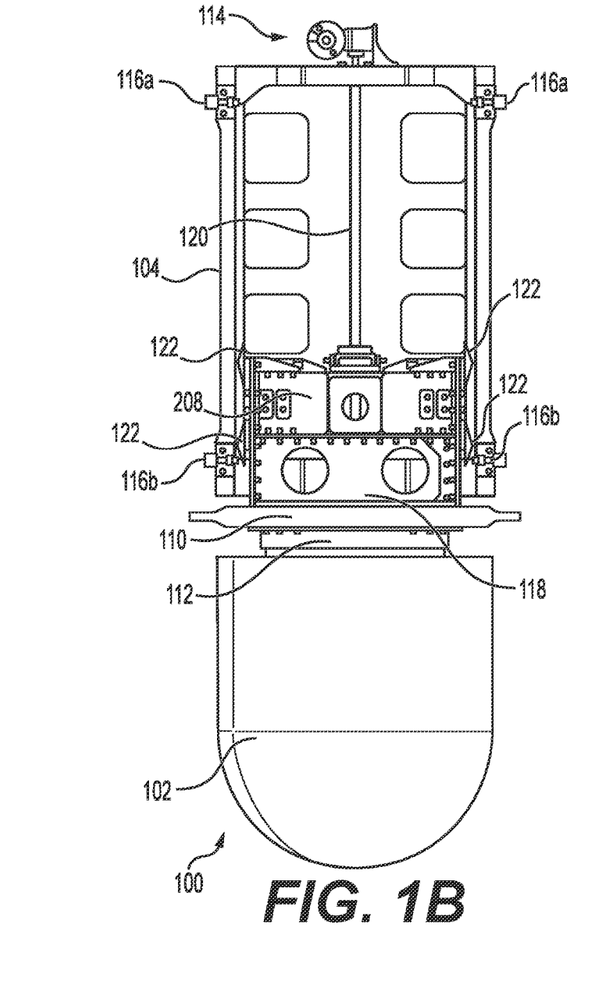
FIG. 1B illustrates the sensor lift mechanism in an deployed position into an airstream outside of an aircraft for some embodiments.

FIGS. 1A and 1B show a sensor lift mechanism 100 for stowing and deploying a sensor 102 from inside an aircraft. FIG. 1A shows sensor 102 in the stowed position and FIG. 1B shows sensor 102 in the deployed position. While in the deployed position, sensor 102 extends from beneath the aircraft into the airstream during flight. Sensor lift mechanism 100 may comprise elevator frame 104, platform structure 106 (see FIG. 1C), roller carriage assembly 108, sensor platform 110, adapter plate 112, drive unit 114, upper limit switches 116a, lower limit switches 116b, support plate 118, and ball screw 120. Broadly, sensor lift mechanism 100 operates via drive unit 114 powering roller carriage assembly 108 to raise and lower sensor 102 into and out of the aircraft. Drive unit 114 may power ball screw 120 to raise and lower sensor 102.

In some embodiments, sensor 102 comprises an instrument, a camera, a radar sensor, a lidar sensor, or any other sensor. In some embodiments, sensor 102 is deployed out of a nose section of the aircraft. In some embodiments, sensor 102 has a diameter of about 10 inches to about 26 inches. In some embodiments, sensor 102 has a diameter of about 20 inches. In some embodiments, sensor lift mechanism 100 is configured to hold a sensor 102 having a weight of about 80 pounds to about 250 pounds. Alternatively, other payloads besides sensors may be deployed from, and raised into, an aircraft compartment using sensor lift mechanism 100 without departing from the scope hereof.

Platform structure 106 may connect roller carriage assembly 108 to sensor platform 110 via a series of bolts, screws, welds, mounting plates, mounting brackets, or any combination thereof. Platform structure 106 may comprise triggers configured to trigger limit switches 116a, 116b. Limit switches 116a, 116b may control the end travel points of roller carriage assembly 108. For example, when triggers 122 near or contact upper limit switches 116a disposed near the top of elevator frame 104, sensor lift mechanism 100 is considered to be in a raised position with sensor 102 disposed substantially within the aircraft. Likewise, when triggers 122 near lower limit switches 116b disposed near the bottom of elevator frame 104, sensor lift mechanism 100 is considered to be in a deployed position with sensor 102 extended into the airstream. When a limit switch 116a, 116b is triggered, a signal may be sent to drive unit 114 to power off. In some embodiments, adapter plate 112 is connected to sensor platform 110, attaches to sensor 102, and is configured to receive various sized sensors 102 in sensor lift mechanism 100.

Figure 1C:
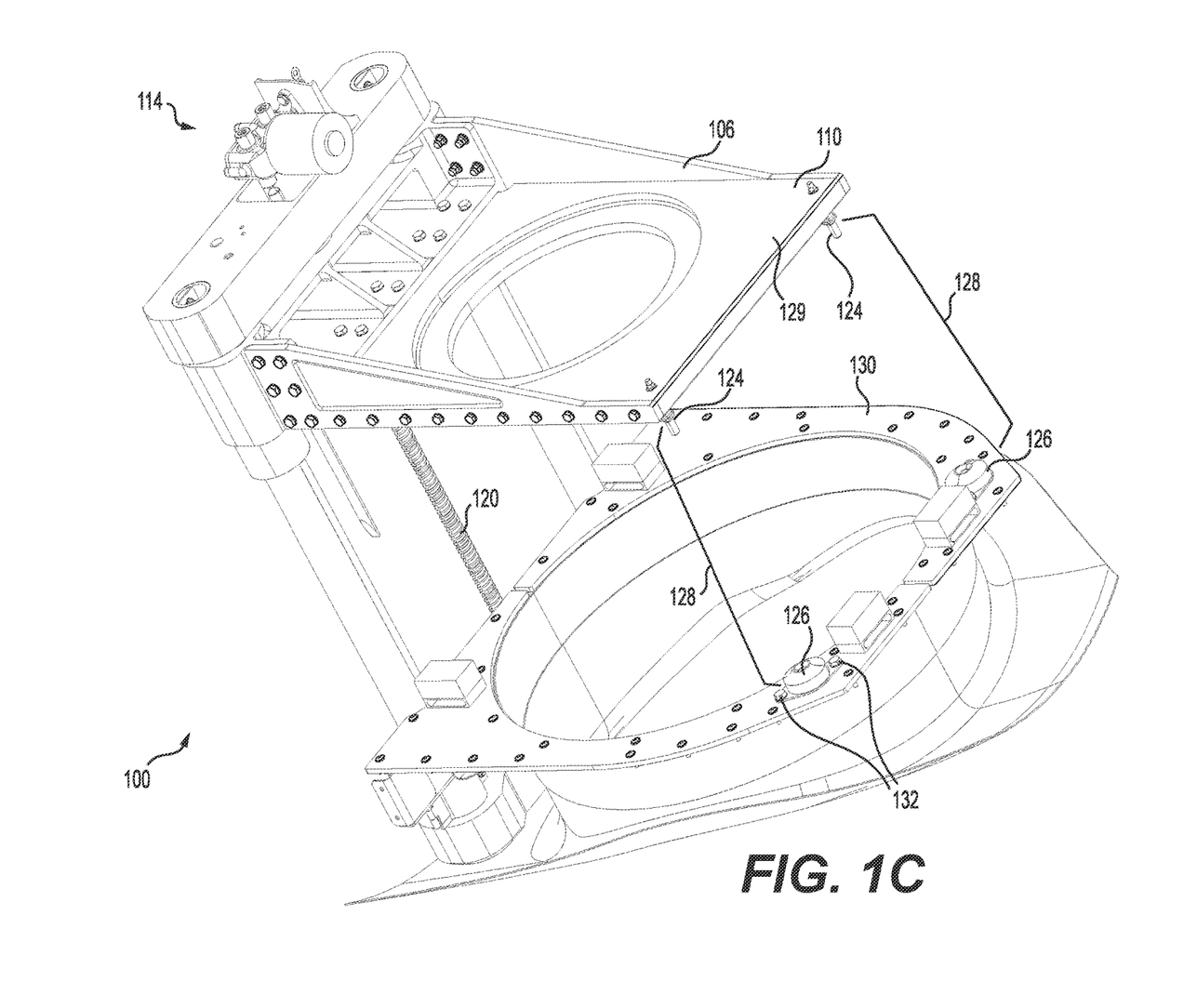
FIG. 1C illustrates a perspective view of the sensor lift mechanism for some embodiments.

Turning now to FIG. 1C, a perspective view of sensor lift mechanism 100 in the raised position showing pins 124 and isolator mounts 126 of isolator assembly 128 for some embodiments is depicted. Each isolator assembly 128 may comprise a pin 124 and a corresponding isolator mount 126. In some embodiments, sensor lift mechanism 100 comprises two isolator assemblies 128. However, it is contemplated that sensor lift mechanism 100 may comprise fewer or more isolator assemblies 128 as dictated by the use case. Pins 124 may be coupled to sensor platform 110 near a front section 129 thereof. Isolator mounts 126 may be attached to a plate 130 via fasteners 132. Fasteners 132 may comprise screws, bolts, rivets, welds, or the like. Plate 130 includes a through-hole for sensor 102 to extend through when the sensor 102 is deployed. Plate 130 and sensor platform 110 are configured to support and stabilize sensor 102 when deployed.

Pins 124 may be tapered at a distal end as discussed further below. The tapered, distal end may be inserted into isolator mount 126. Isolator mount 126 may comprise a slot and optionally a seat disposed in the slot for receiving pin 124. In embodiments, pin 124 has a circular cross-section and the seat has a conical opening and the slot comprises a cylindrical channel. In some embodiments, the seat of isolator mount 126 is configured to receive the shoulder 208 of pin 124 (see FIGS. 2A and 2B); in other embodiments, the seat of isolator mount is configured to receive the tapered portion of pin 124 (see FIG. 2C). As discussed further below, the seat and slot are configured to prevent pin 124 from substantially moving in the X- and Y-directions and the downwards Z-direction, while allowing free motion in the upwards Z-direction for raising sensor 102. Thus, while sensor 102 is deployed, air loads may be transferred to isolator mount 126 as compressive loads in the X- and Y-directions, along with the downwards Z-direction.

Figure 3A:
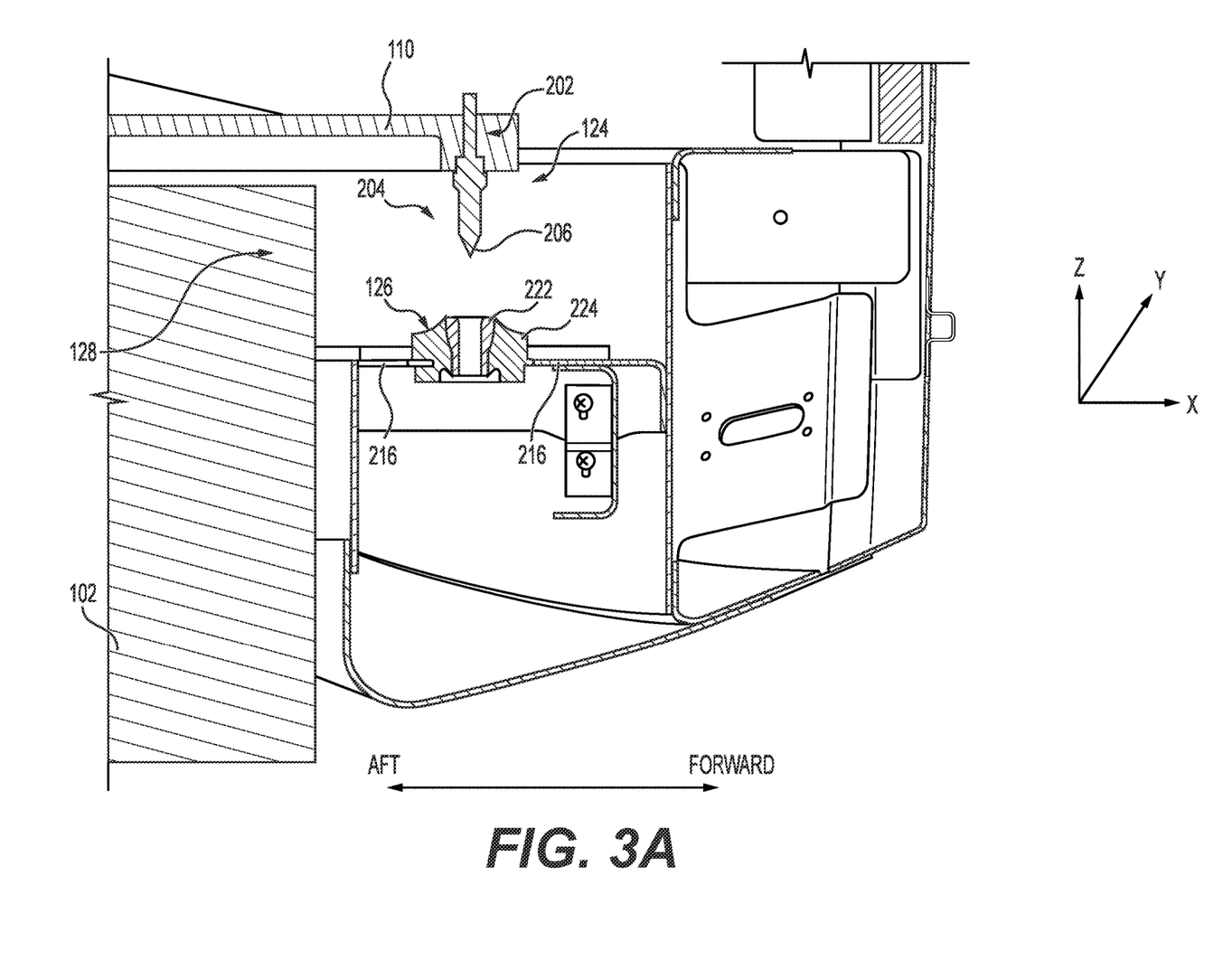
FIG. 3A illustrates the isolator assembly when the sensor lift mechanism is in a partially raised position for some embodiments.
Figure 3B:
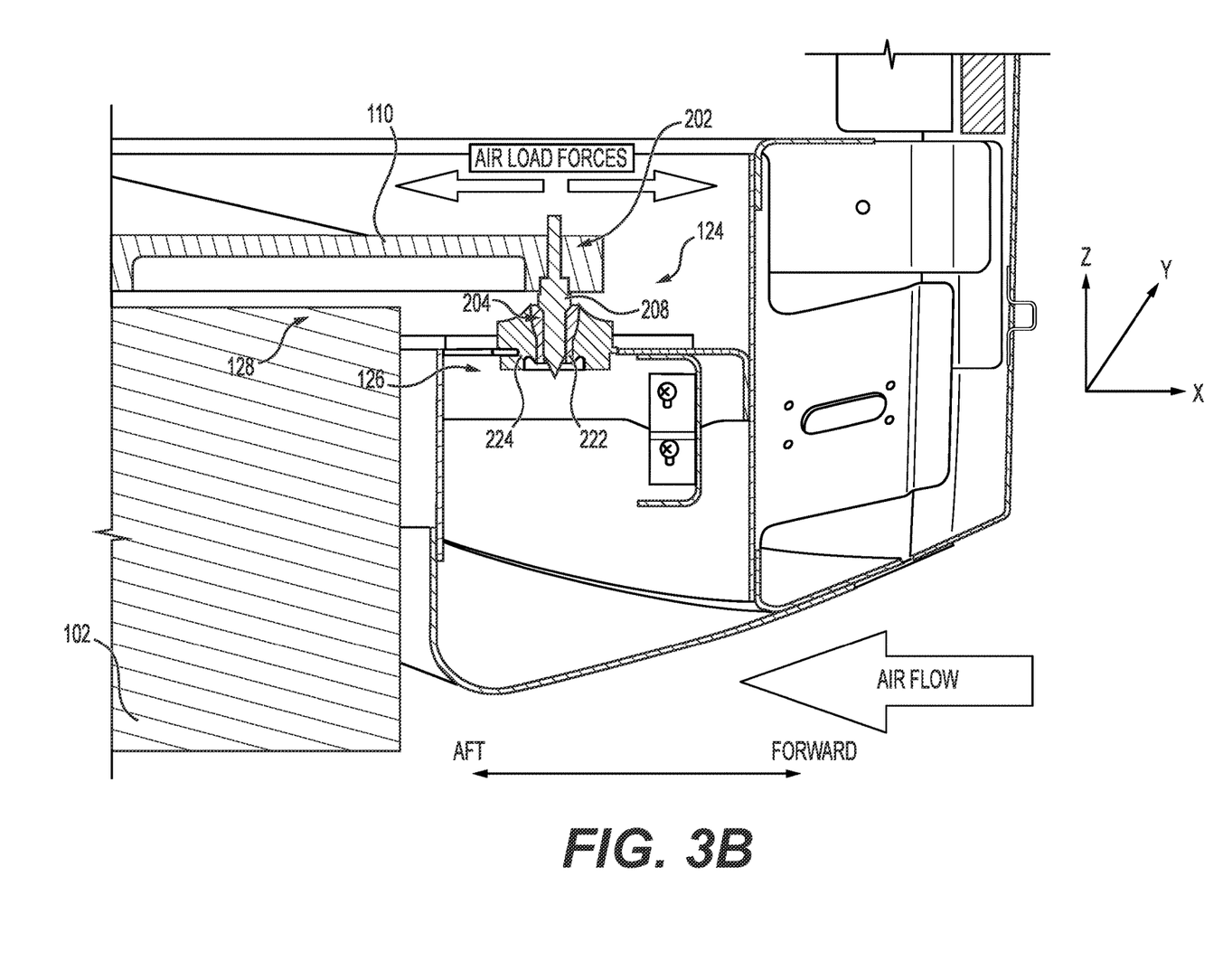
FIG. 3B illustrates the isolator assembly when the sensor lift mechanism is in the deployed position for some embodiments.

As described above, drive unit 114 may be actuated to lower sensor 102 into the airstream whereupon pins 124 are inserted into isolator mounts 126 as illustrated in FIG. 3B. As sensor 102 is deployed in the airstream, oscillation air loads, such as those resulting from vortex shedding, impact sensor 102. Isolator assembly 128 may then mitigate these air loads as described in embodiments herein. Thus, the overall performance and lifespan of sensor 102 may be improved because the forces imparted thereon may be mitigated.

Figure 2A:
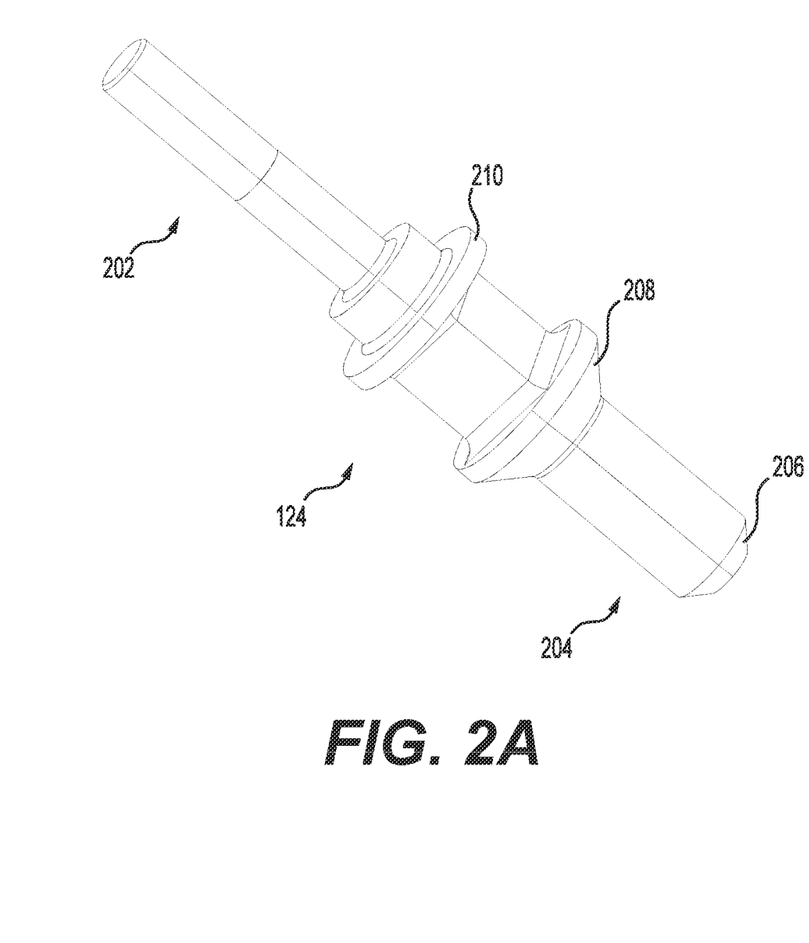
FIG. 2A illustrates a pin of an isolator assembly for the sensor lift mechanism for some embodiments.
Figure 4:
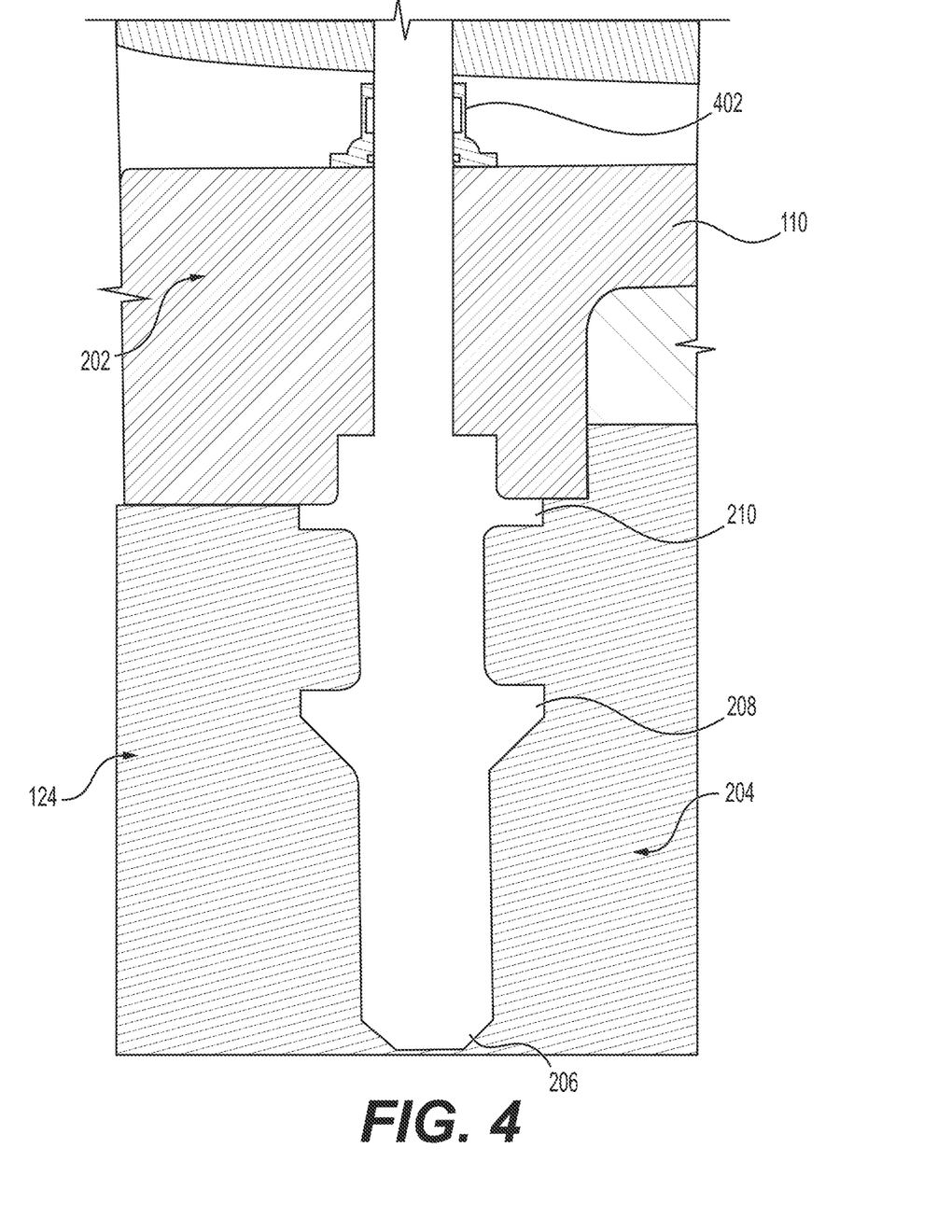
FIG. 4 illustrates a cross-sectional view of the pin coupled to a platform of the sensor lift mechanism for some embodiments.

FIG. 2A illustrates pin 124 for isolator assembly 128 for some embodiments. Pin 124 may comprise a proximal end 202 and a distal end 204. Proximal end 202 may project substantially upwards from sensor platform 110 towards drive unit 114. Distal end 204 may project substantially downwards from sensor platform 110 and towards the airstream. As illustrated, distal end 204 may comprise a taper 206. Pin 124 may also comprise a shoulder 208. A face 210 may abut against a bottom face of sensor platform 110 as illustrated in FIG. 4 below. Pin 124 may comprise a metal or metal alloy including such materials as steel, titanium, aircraft-grade aluminum, or the like.

Figure 2B:
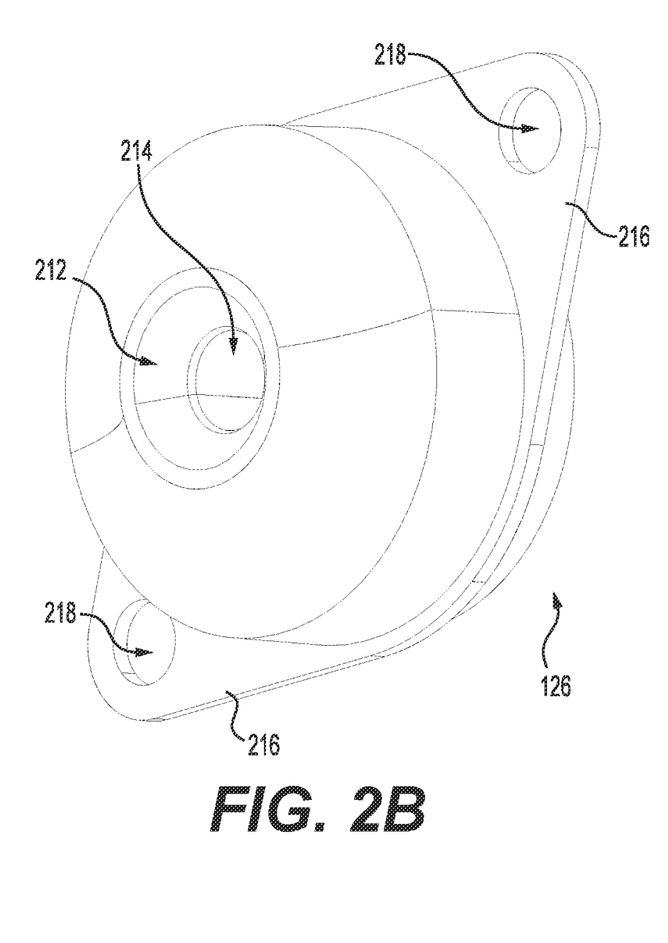
FIG. 2B illustrates an isolator of the isolator assembly for some embodiments.

FIG. 2B illustrates isolator mount 126 for isolator assembly 128 for some embodiments. Isolator mount 126 may comprise a seat 212 for receiving shoulder 208 such that pin 124 is prevented from translating further in the downwards Z-direction. Motion in the upwards Z-direction may be permitted to allow sensor lift mechanism 100 to retract sensor 102 back within the aircraft. A slot 214 in seat 212 may comprise a diameter that substantially matches the diameter of distal end 204 such that distal end 204 fits within slot 214 but is prevented from substantially translating in the X- and Y-directions once seated therein. In the embodiment shown in FIG. 2B, seat 212 has a conical shape around a circumference of the opening to slot 214, which slot comprises a hollow cylindrical channel. In the embodiment shown in FIG. 2A, shoulder 208 has a conical shape configured to match the conical shape of seat 212. Isolator mount 126 may also comprise flanges 216 with through-holes 218 through which fasteners 132 may be inserted to secure isolator mount 126 to plate 130 as described above. As illustrated in FIGS. 2C, 2D, 3A, and 3B, isolator mount 126 may comprise an inner portion and an outer portion surrounding said inner portion.

Figure 2C:
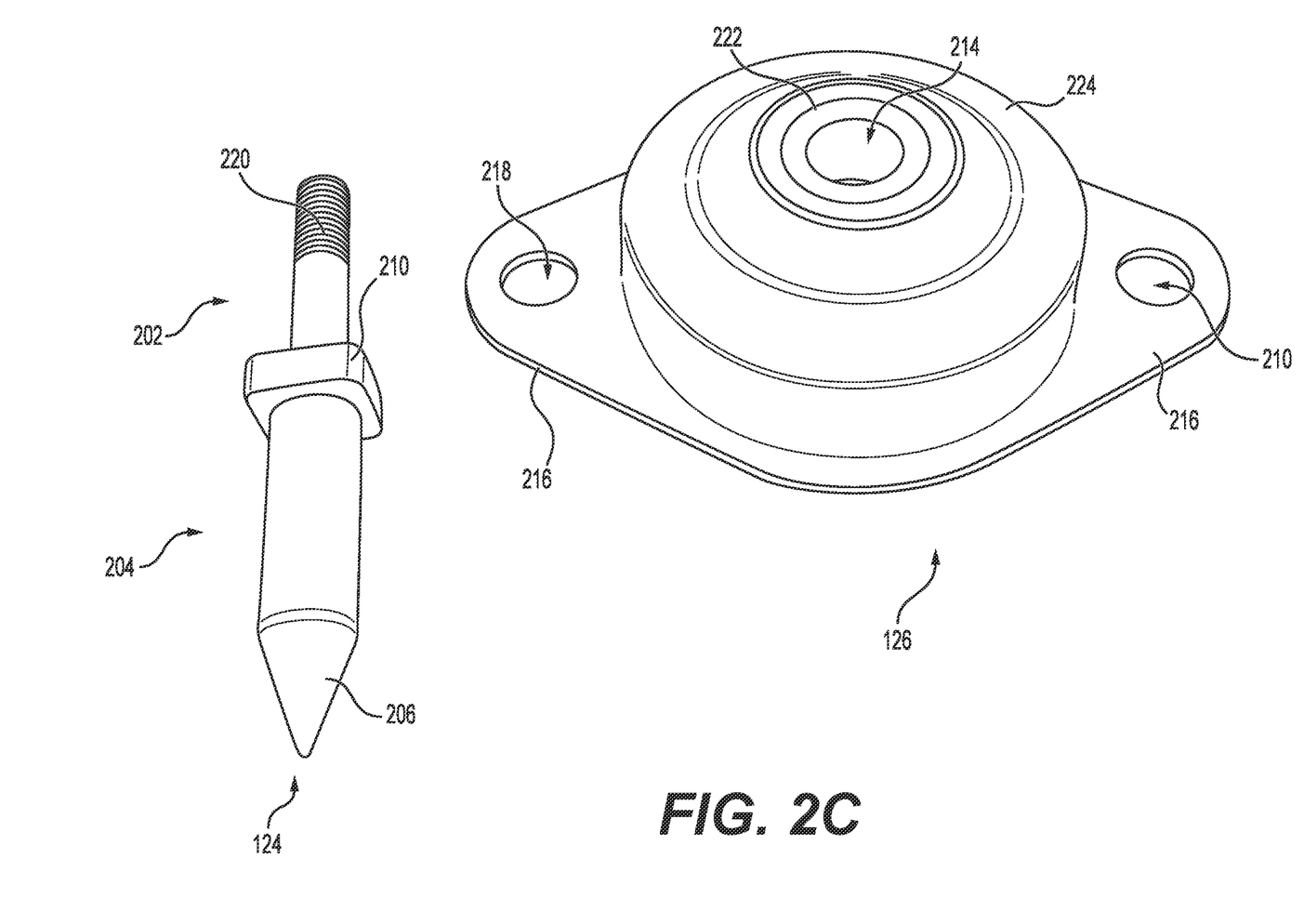
FIG. 2C illustrates the isolator assembly for some embodiments.
Figure 2D:
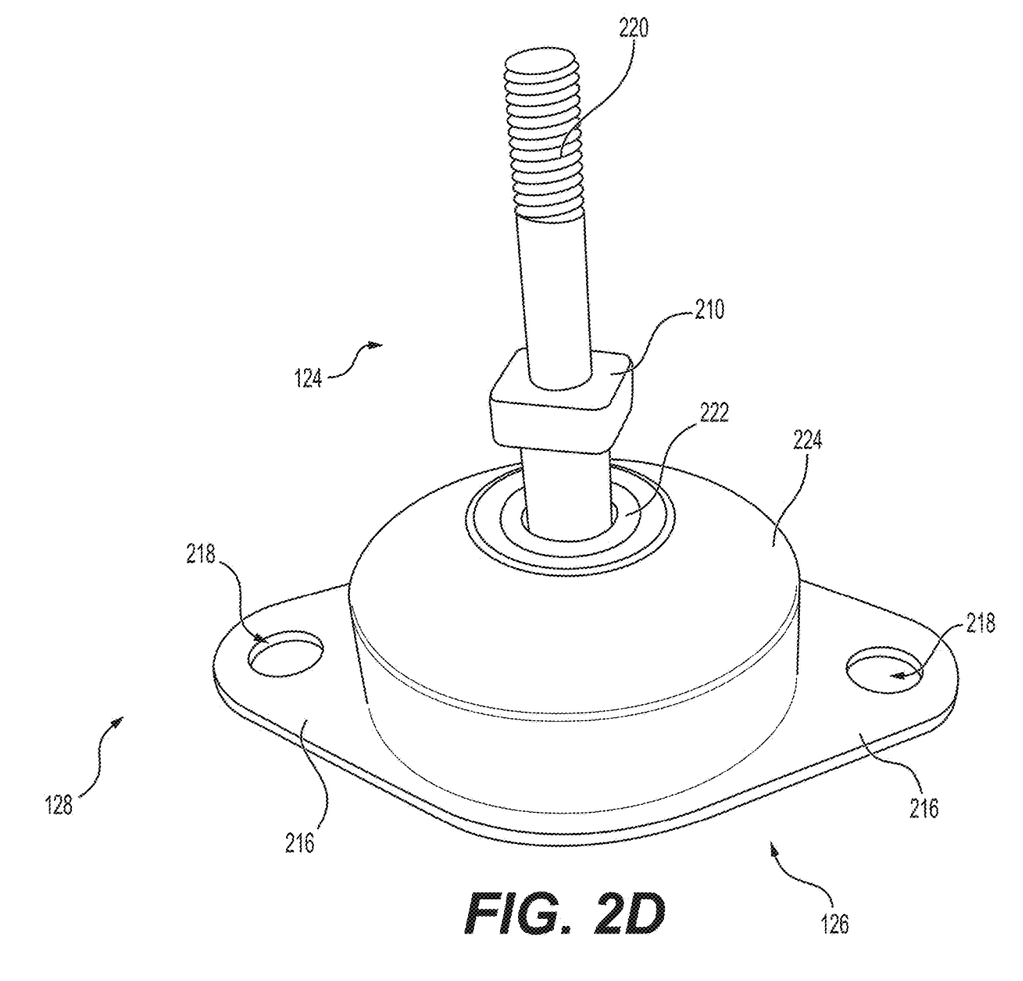
FIG. 2D illustrates the isolator assembly with the pin inserted into the isolator for some embodiments.

FIG. 2C and FIG. 2D illustrate pin 124 and isolator mount 126 for some embodiments. As shown, shoulder 208 may be omitted from distal end 204. In some such embodiments, distal end 204 may be substantially cylindrical before transitioning into taper 206. The parameters of taper 206 (e.g., major and minor diameters and length) may vary in some embodiments. Further, in some embodiments, face 210 may comprise a substantially square or rectangular shape. Broadly, face 210 may comprise any geometrical shape. Proximal end 202 may also comprise a threaded outer portion 220 along which a nut may be threaded to secure pin 124 to sensor platform 110 as discussed below with respect to FIG. 4.

Isolator mount 126 may comprise an inner portion 222 and an outer portion 224. Inner portion 222 may comprise metal or metal alloy and may have a conical-tapered upper portion through which pin 124 is received. Inner portion 222 and outer portion 224 are discussed further below with respect to FIGS. 3A and 3B.

Figure 2E:
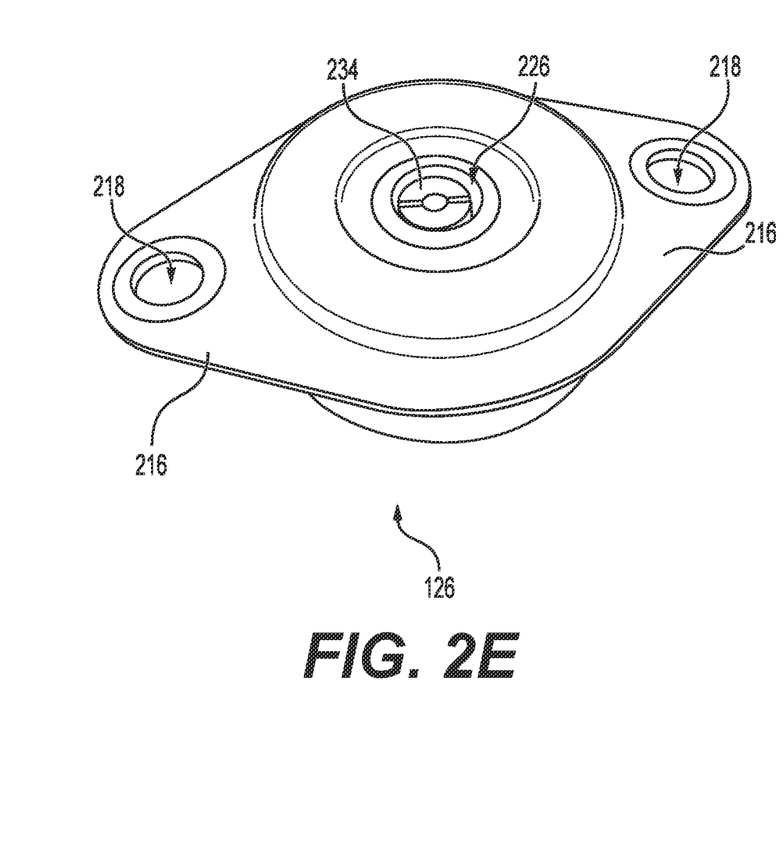
FIG. 2E illustrates a first bottom view of the isolator with an adjustable conical seat inserted therein for some embodiments.
Figure 2F:
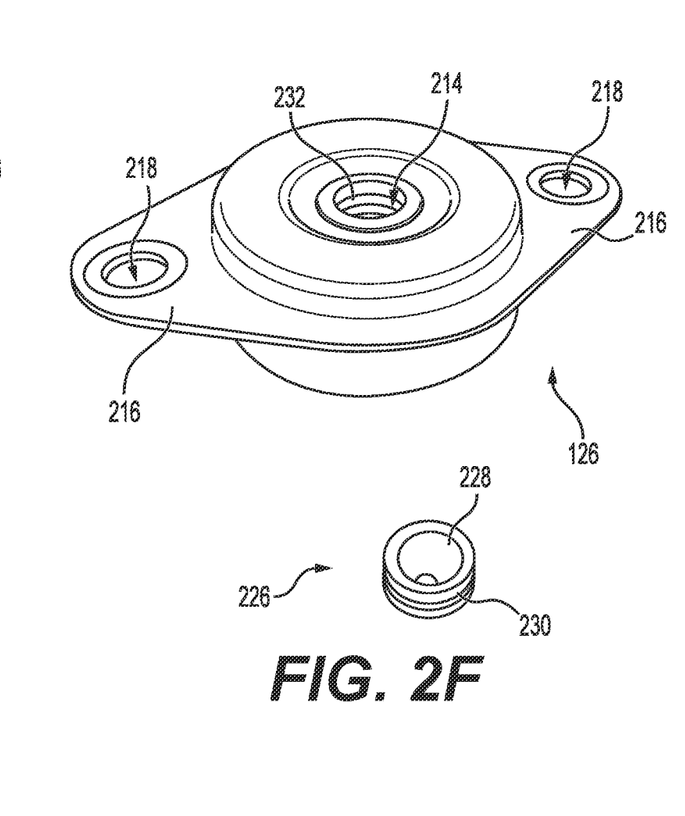
FIG. 2F illustrates a second bottom view of the isolator with the adjustable conical seat removed therefrom for some embodiments.

FIG. 2E and FIG. 2F illustrate a view of a bottom of isolator mount 126 for some embodiments. As described above, isolator mount 126 may comprise an adjustable seat 226. Adjustable seat 226 may be disposed within slot 214. As seen in FIG. 2F, in some embodiments, adjustable seat 226 comprises a substantially conical cup 228 for receiving taper 206 of pin 124. However, it should be noted that the adjustable seat 226 is not limited to a conical shape and may be any shape for receiving distal end 204 of pin 124. Adjustable seat 226 may comprise exterior threads 230 configured to cooperate with interior threads 232 of slot 214. In some embodiments, a bottom face 234 (see FIG. 2E) of adjustable seat 226 is configured (e.g., with a slot) for receiving a tool (e.g., a flathead screwdriver) to allow for the adjustable seat 226 to be moved upwards and downwards along the interior threads 232 of slot 214 as further described below.

As described above, the preload in the Z-axis may be varied for isolator assembly 128 to account for parameters such as oscillation frequency and the weight of sensor 102. The amount of preload may also affect the damping response of isolator mount 126 which may function substantially similar to a spring due to the vibration-damping material thereof. Pin 124 may be preloaded such that pin 124 is substantially constantly in contact with isolator mount 126 when sensor lift mechanism 100 is in the deployed position as illustrated in FIG. 3B below. The preload may be varied by adjusting the height of adjustable seat 226 by rotation of adjustable seat 226 via exterior threads 230 within interior threads 232 of slot 214. Rotation of adjustable seat 226 may be performed by a user with a tool (e.g., a flathead screwdriver) inserted into the slot of bottom face 234. To decrease the preload on pin 124, adjustable seat 226 may be moved downwards towards a bottom of slot 214. To increase the preload on pin 124, adjustable seat 226 may be moved upwards towards a top of slot 214. Thus, isolator assembly 128 may be configured for various use cases by varying the preload and/or the vibration isolating material of isolator mount 126 to handle the oscillation loads imparted on sensor 102. For example, for a lighter sensor 102, the amount of preload on pin 124 may be increased to handle the increased air load forces imparted on sensor 102.

FIGS. 3A and 3B illustrate cross-sectional views of isolator assembly 128 for some embodiments. FIG. 3A illustrates isolator assembly 128 in a partially raised position for some embodiments, and FIG. 3B illustrates isolator assembly 128 in a deployed position wherein sensor 102 is extended into the airstream for some embodiments. In some embodiments, pins 124 are oriented in the Z-direction as shown.

As previously described, isolator mount 126 may comprise inner portion 222 and outer portion 224. Inner portion 222 may comprise seat 212 and slot 214. Inner portion 222 may comprise a metal (e.g., steel, aluminum, alloys thereof, etc.). Inner portion 222 may be formed substantially similar to a grommet. Outer portion 224 may comprise a vibration-damping material, such as rubber, polytetrafluorethylene (PTFE), synthetic rubber, polyimide, or any other polymer, and forms a ring surrounding inner portion 222. In some embodiments, inner portion 222 (i.e., seat 212) comprises an outer diameter of about 20 millimeters to about 25 millimeters and an inner diameter of about 8 millimeters to about 12 millimeters. In some embodiments, outer portion 224 comprises an outer diameter of about 45 millimeters to about 55 millimeters and an inner diameter of about 20 millimeters to about 25 millimeters. The outer diameter of inner portion 222 may be substantially flush with the inner diameter of outer portion 224. By surrounding inner portion 222 with the vibration-damping outer portion 224, oscillating air loads applied to sensor 102 may be substantially reduced. Forces in both the positive and negative X- and Y-directions may be transferred to outer portion 224 as compressive loads. Similarly, Z-forces in the negative direction (downward) may also be transferred to outer portion 224 as compressive loads. The received compressive loads may provide a counteracting force relative to the amplitude of deflection from the oscillating forces. Thus, a substantially constant damping response to the oscillating air loads experienced when sensor 102 is deployed into the airstream may be realized. Furthermore, the material selection for outer portion 224 may be varied to allow for isolator assembly 128 to be tailored for various oscillation frequencies and magnitudes of absorbed forces.

FIG. 3B illustrates isolator assembly 128 in the deployed position for some embodiments. As shown, distal end 204 may be received in slot 214, and shoulder 208 may be received in seat 212. For example, shoulder 208 is shaped to match seat 212 such that their surfaces abut one another when isolator assembly 128 is in the deployed position. Additionally, seat 212 and taper 206 are shaped to help guide distal end 204 into slot 214. Sensor 102 may be deployed into the airstream and impacted by the air flow as shown. As such, air-load forces may be imparted onto sensor 102 which may then be mitigated by isolator assembly 128 as described above.

FIG. 4 illustrates a close-up view of a pin 124 inserted into sensor platform 110 for some embodiments. As described above, face 210 of pin 124 may abut against a bottom surface of sensor platform 110. Pin 124 may be preloaded such that pin 124 is substantially constantly in contact with isolator mount 126 when sensor lift mechanism 100 is in the deployed position as illustrated in FIG. 3B above. Pin 124 may be secured with a nut 402 which may cooperate with threaded outer portion 220 in some embodiments. In some embodiments, pin 124 is screwed into sensor platform 110 and secured at the desired height/preload with nut 402.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An isolator assembly, comprising:
    a platform configured for being raised upwards and lowered downwards;
    a pin having first end and a second end opposite the first end, wherein the pin is mechanically coupled to the platform via the first end, and the second end extends downwardly below the platform; and
    an isolator mount fastened to a plate, wherein the isolator mount comprises:
        a vibration-damping material;
        a slot configured to receive the pin, wherein the slot comprises a seat having a conical shape around a circumference of the slot at an upper side of the isolator mount; and
    upon lowering the platform downwards, the pin is inserted into the isolator mount such that vibrational motion from the platform is damped via the isolator mount.

2. The isolator assembly of claim 1, wherein the platform is configured for supporting a sensor to be deployed beneath an aircraft when lowered downwards, and the isolator mount is configured to damp vibrations caused by airstream loads onto the sensor during flight of the aircraft.

3. The isolator assembly of claim 1, wherein the second end of the pin comprises a tapered end.

4. The isolator assembly of claim 1, wherein the isolator mount comprises:
    an outer portion comprising the vibration-damping material; and
    an inner portion disposed within the outer portion, wherein the inner portion comprises a metal configured to form the slot and the slot is substantially cylindrical.

5. The isolator assembly of claim 1, wherein the pin comprises a shoulder having a conical portion configured to match the seat such that travel of the pin is limited of the pin into the slot.

6. The isolator assembly of claim 1, wherein the pin comprises a tapered end and the seat comprises a conical cup configured to receive the tapered end.

7. The isolator assembly of claim 6, wherein the slot comprises internal threads and the seat comprises external threads configured to cooperate with the internal threads such that a position of the seat within the slot is adjustable via the threads.

8. The isolator assembly of claim 6, wherein the pin is configured to insert into the isolator mount to provide a preload force between the platform and the isolator mount, and an adjustment of the seat is configured to adjust an amount of the preload force.

9. An isolator assembly for damping vibrations of a sensor deployed outside of an aircraft, the isolator assembly comprising:
    a platform configured for mechanically supporting the sensor;
    a lift mechanism configured to raise and lower the platform for stowing the sensor inside the aircraft and deploying the sensor outside the aircraft;
    a plate secured inside the aircraft beneath the platform, wherein the plate comprises a through-hole for the sensor to extend therethrough;

a pin extending below the platform; and an isolator mount disposed on a top side of the plate, wherein the isolator mount comprises a slot configured to receive the pin upon deploying the sensor outside the aircraft, wherein the isolator mount, the platform, and the plate are configured to stabilize the sensor.

10. The isolator assembly of claim 9, wherein the isolator mount comprises:

an inner portion comprising a metal shaped to form the slot;

an outer portion comprising a ring of vibration-damping material surrounding the inner portion; and a pair of flanges configured for fastening the isolator assembly to the plate.

11. The isolator assembly of claim 10, wherein the slot comprises:

an opening at a top side of the slot, wherein the opening comprises a conical taper with a wider outer portion and a narrower inner portion; and a cylindrical channel extending from the narrower inner portion through to a bottom side of the slot.

12. The isolator assembly of claim 11, wherein the slot comprises a seat and the pin comprises a shoulder, and the seat and the shoulder are configured to interface with each other when the pin is received in the slot.

13. The isolator assembly of claim 12, wherein the seat is formed in the conical taper of the opening.

14. The isolator assembly of claim 11, comprising a seat having a conical cup, wherein the seat is configured to be inserted through the bottom side of the slot.

15. The isolator assembly of claim 14, wherein an exposed end of the pin comprises a conical taper configured to match the conical cup of the seat.

16. The isolator assembly of claim 14, wherein the cylindrical channel comprises interior threads and the seat comprises exterior threads configured to cooperate with the interior threads such that the seat is threaded into the slot.

17. The isolator assembly of claim 16, wherein a position of the seat within the slot is adjustable via the interior and exterior threads.

18. The isolator assembly of claim 17, wherein contact between the pin and the seat comprises a preload that is adjustable by adjusting the position of the seat within the slot.

19. The isolator assembly of claim 9, wherein the isolator assembly comprises a plurality of pins and a corresponding plurality of isolator mounts configured to damp vibrations of the sensor.

* * * * *